US010289525B2

United States Patent
Pasquini et al.

(10) Patent No.: US 10,289,525 B2
(45) Date of Patent: May 14, 2019

(54) MULTI-LAYER DESIGN RESPONSE TIME CALCULATOR

(71) Applicant: Amadeus S.A.S., Biot (FR)

(72) Inventors: Ilaria Pasquini, Vallauris (FR); Nicolas Krasensky, Cagnes sur mer (FR); Christelle Legrand, Antibes (FR); Rohit Aggarwal, New Delhi (IN)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 15/681,715

(22) Filed: Aug. 21, 2017

(65) Prior Publication Data

US 2019/0057016 A1 Feb. 21, 2019

(51) Int. Cl.
*G06F 9/44* (2018.01)
*G06F 17/30* (2006.01)
(Continued)

(52) U.S. Cl.
CPC .......... *G06F 11/3616* (2013.01); *G06F 9/465* (2013.01); *G06F 8/20* (2013.01);
(Continued)

(58) Field of Classification Search
CPC .. G06F 13/4208; G06F 9/5066; G06F 9/5027; G06F 9/4484; G06F 9/5055;
(Continued)

(56) References Cited

U.S. PATENT DOCUMENTS

| 6,256,676 B1 * | 7/2001 | Taylor | G06F 9/465 |
| | | | 709/246 |
| 6,738,975 B1 * | 5/2004 | Yee | G06F 9/541 |
| | | | 719/310 |

(Continued)

FOREIGN PATENT DOCUMENTS

| FR | 3012896 A1 | 5/2015 |
| WO | 0133356 A1 | 5/2001 |

OTHER PUBLICATIONS

Hakan Hacigumus, Middleware Support for Auditing Service Process Flow, Nov. 27-Dec. 1, 2006, [Retrieved on May 14, 2018]. Retrieved from the internet: <URL: https://dl.acm.org/citation.cfm?id=1169095> 6 Pages (24-29) (Year: 2006).*

(Continued)

*Primary Examiner* — Anibal Rivera
(74) *Attorney, Agent, or Firm* — Thompson Hine LLP (57) ABSTRACT

Methods, systems, and computer program products for integrating front-end applications with application program interfaces (APIs) and middleware business services. A front-end application flow, including at least one call to one or more business services flows, and one or more business services flows, each including one or more calls to application program interfaces (APIs), are received at a processor and the processor compiles a complete end-to-end flow that includes the front-end application flow and the one or more business services flows. The complete end-to-end flow is expressed in ordered terms of the one or more business services flows and the one or more calls to the APIs. A projected latency for the complete end-to-end flow is automatically constructed by the processor by totaling response times for each of the one or more calls to the APIs included in the complete end-to-end flow.

15 Claims, 5 Drawing Sheets

(51) Int. Cl.
*G06F 15/16* (2006.01)
*G06F 9/54* (2006.01)
*G06F 11/36* (2006.01)
*G06F 9/46* (2006.01)
G06F 8/20 (2018.01)
G06F 16/25 (2019.01)
G06F 16/958 (2019.01)

(52) U.S. Cl.
CPC ............ *G06F 9/541* (2013.01); *G06F 16/256* (2019.01); *G06F 16/972* (2019.01)

(58) Field of Classification Search
CPC .......... G06F 9/542; G06F 9/546; G06F 9/466; G06F 9/541; G06F 9/465; G06F 9/45558; G06F 8/20; G06F 8/70; G06F 8/30; G06F 8/10; G06F 17/30893; G06F 17/30566; G06F 11/3684
See application file for complete search history.

(56) References Cited

U.S. PATENT DOCUMENTS

| | | | | |
|---|---|---|---|---|
| 7,401,011 | B1* | 7/2008 | Levine | G06Q 10/06 703/2 |
| 7,497,688 | B1* | 3/2009 | Judd | G06Q 10/06 434/219 |
| 7,970,918 | B2* | 6/2011 | Thompson | H04L 45/24 709/230 |
| 8,073,932 | B2* | 12/2011 | Choi | G06Q 10/107 709/219 |
| 8,335,794 | B1 | 12/2012 | Goodson et al. | |
| 8,346,929 | B1* | 1/2013 | Lai | G06Q 10/10 709/226 |
| 9,229,795 | B2* | 1/2016 | Maes | G06F 9/546 |
| 9,336,060 | B2* | 5/2016 | Nori | H04L 41/0806 |
| 9,817,657 | B2* | 11/2017 | Hill | G06F 8/70 |
| 2002/0026630 | A1* | 2/2002 | Schmidt | G06F 8/20 717/103 |
| 2002/0042849 | A1* | 4/2002 | Ho | G06F 9/5027 719/329 |
| 2002/0178170 | A1* | 11/2002 | Britton | G06F 17/30893 |
| 2003/0120502 | A1* | 6/2003 | Robb | G06Q 30/04 705/34 |
| 2004/0055002 | A1* | 3/2004 | Das | G06F 9/5055 718/107 |
| 2004/0111464 | A1* | 6/2004 | Ho | H04L 29/06 709/203 |
| 2006/0031225 | A1* | 2/2006 | Palmeri | G06F 17/30566 |
| 2006/0146991 | A1* | 7/2006 | Thompson | G06F 9/542 379/67.1 |
| 2006/0149840 | A1* | 7/2006 | Thompson | H04L 45/24 709/224 |
| 2006/0156314 | A1* | 7/2006 | Waldorf | G06F 9/4484 719/328 |
| 2007/0150480 | A1* | 6/2007 | Hwang | G06Q 10/00 |
| 2008/0086348 | A1* | 4/2008 | Rao | G06Q 10/063 705/7.11 |
| 2009/0158246 | A1* | 6/2009 | Sifter | G06F 8/20 717/105 |
| 2010/0037237 | A1* | 2/2010 | Reinart | G06F 9/541 719/313 |
| 2010/0161821 | A1* | 6/2010 | Slamkovic | G06F 9/54 709/230 |
| 2012/0324069 | A1* | 12/2012 | Nori | G06F 9/5066 709/222 |
| 2013/0110908 | A1* | 5/2013 | Bahlke | H04L 67/10 709/203 |
| 2013/0346123 | A1* | 12/2013 | Pelissier | G06Q 10/02 705/5 |
| 2014/0245262 | A1* | 8/2014 | Hill | G06F 8/70 717/120 |
| 2015/0063166 | A1* | 3/2015 | Sif | G06F 9/45558 370/254 |
| 2015/0331828 | A1* | 11/2015 | Maes | G06F 13/4208 710/104 |
| 2016/0048790 | A1* | 2/2016 | Ritter | G06Q 10/06316 705/7.26 |
| 2016/0232042 | A1* | 8/2016 | Ritter | G06F 8/10 |
| 2016/0269926 | A1* | 9/2016 | Sundaram | H04W 28/0226 |
| 2017/0149609 | A1* | 5/2017 | Tofighbakhsh | H04W 24/02 |
| 2018/0121259 | A1* | 5/2018 | Bussler | G06F 9/541 |
| 2018/0129593 | A1* | 5/2018 | Hariharan | G06F 11/3684 |

OTHER PUBLICATIONS

Naveen Erasala et al., Enterprise Application Integration in the electronic commerce world , Oct. 2002, [Retrieved on Jan. 28, 2019]. Retrieved from the internet: <URL: https://ac.els-cdn.com/S092054890200106X/1-s2.0-S092054890200106X-main.pdf? > 14 Pages (69-82) (Year: 2002).*

Richard E. Schantz et al., Middleware for Distributed Systems, Evolving the Common Structure for Network-centric Applications, 2001, [Retrieved on Jan. 28, 2019]. Retrieved from the internet: <URL: http://citeseerx.ist.psu.edu/viewdoc/download?doi=10.1.1.29.2889&rep=rep1&type=pdf> 15 Pages (1-15) (Year: 2001).*

Couchbase, "Couchbase Customer: Amadeus", Aug. 20, 2015, retrieved from the internet www.couchbase.com.

Alex Woodie, "Amadeus Travel Goes Up Tempo with CouchbaseDB", EnterpriseTech Nov. 21, 2013, retrieved from the internet https://www.enterprisetech.com/2013/11/21/amadeus-travel-goes-tempo-couchbasedb/.

Google Cloud Platform Blog: With Amadeus, Cloud is in the Air, Jan. 5, 2016, retrieved from the internet https://cloudplatform.googleblog.com/2016/01/with-Amadeus-Cloud-is-in-the-Air.html.

National Institute of Industrial Property, Preliminary Search Report issued in French Application No. 1757763 dated May 3, 2018.

Keung, et al., "A Statistical Method for Middleware System Architecture Evaluation," 2010 21st Australian Software Engineering Conference, Auckland, 2010, pp. 183-191.

* cited by examiner

MULTI-LAYER DESIGN RESPONSE TIME CALCULATOR

BACKGROUND

The invention is generally related to computers and computer software, and in particular to enterprise application integration (EAI) methods, systems, and computer program products for integrating front-end applications with application program interfaces (APIs) and middleware business services.

Travel industry software, such as supply chain management applications, enterprise resource planning (ERP) systems, and business intelligence applications, must communicate with one another in order to share data or business rules. In order to avoid lack of communication and resulting inefficiencies, e.g., duplicate data stored in multiple locations or automation difficulties, applications must be linked while also making as few changes to the existing applications or data structures as possible.

EAI uses software and computer systems' architectural principles to integrate enterprise computer applications, facilitating communication across the applications. EAI in the travel industry is typically performed by separate development teams, often defining dependencies on either a singular impromptu point-to-point basis or in separate isolated groups, resulting in a complex development process that is difficult to integrate across teams. Furthermore, it is not possible to represent and integrate the outcome of such orchestration until the EAI process has been completed and all of the dependencies have been compiled, including providing key intermediate information such as response time projections.

In order to assess the integration of travel industry software throughout the development and orchestration process, a continuing need exists for computer-based middleware flow assessment tools, as well as improved methods and computer program products for providing key development metrics.

SUMMARY

According to an embodiment of the invention, a method of middleware flow assessment in an EAI system may be provided. The EAI system may facilitate data exchange between at least a front-end application, one or more middleware web-based business services, and one or more middleware APIs. The front-end application may be directly accessed by a client to receive or utilize back-end capabilities of the travel system, enabling the client to request the business services of the travel system, and the one or more APIs may act as interfaces between business services and the back-end travel system, specifying how each communicates with the other and providing a common set of controls. A front-end application flow and one or more business services flows may be received, the front-end application flow including at least one call to one or more business services flows and the one or more business services flows including one or more calls to APIs. A complete end-to-end flow expressing the one or more business services flows and the one or more calls to the APIs in ordered terms may be compiled and a projected latency for the complete end-to-end flow may be constructed by totaling the response times for each of the one or more calls to the APIs included in the complete end-to-end flow.

In some embodiments, a sequence diagram representing messaging based on the at least one call to the one or more business services flows and the one or more calls to the APIs in the complete end-to-end flow may be generated.

In other embodiments, a method may be provided for constructing the projected latency for the complete end-to-end flow by retrieving the response times for each of the one or more call to the APIs from a lookup table. Moreover, the response times for each of the one or more calls to the APIs may include latency statistics associated with the APIs.

In another embodiment, a method may be provided for constructing the projected latency by compiling the end-to-end flow based, at least in part, on one or more step identifiers that may define an order of repetition for the front-end application flow and one or more step identifiers that may define an order of repetition for the one or more business services flows.

In yet another embodiment, a method may be provided for constructing the projected latency by compiling the end-to-end flow based, at least in part, on the repeated execution of the front end application flow until one or more conditions for the front-end application flow are satisfied and the repeated execution of the business services flows until one or more conditions for the business services flows are satisfied.

In another embodiment, a method may be provided for constructing the projected latency by storing the front-end application flow with a first listing of one or more business services flows associated with the front-end application flow in a first table, storing a second listing of the one or more business services flows with a listing of the APIs associated with one of the business services flows in a second table, and querying the second table for each of the one or more business services flows in the first table to retrieve each of the APIs associated with the business services flow in the second table corresponding to the business services flows in the first table.

In another embodiment of the invention, a system for assessing middleware flow assessment in an EAI system may be provided. The system may include a processor and a memory storing instructions that, when executed by the processor, may cause the system to receive a front-end application flow including at least one call to one or more business services flows, receive one or more business services flows each including one or more calls to APIs, and compile a complete end-to-end flow that includes the front-end application flow and the one or more business services flows. The complete end-to-end flow may be expressed in ordered terms of the one or more business services flows and the one or more calls to the APIs. The instructions may further cause the system to automatically construct a projected latency for the complete end-to-end flow by totaling response times for each of the one or more calls to the APIs included in the complete end-to-end flow. Moreover, the response times may be received from a lookup table and may include latency statistics associated with the APIs.

Moreover, the instruction may be configured to cause the system to automatically generate a sequence diagram representing messaging based on the at least one call to the one or more business services flows and the one or more calls to the APIs in the complete end-to-end flow.

In yet another embodiment, the front-end application flow may include one or more step identifiers that define an order of repetition for the front-end application flow, the one or more business services flows may include one or more step identifiers that define an order of repetition for the one or more business services flows, and the instructions may be further configured to cause the system to compile the complete end-to-end flow based, at least in part, on the one or more step identifiers of the front-end application flow and the one or more step identifiers of the one or more business services flows.

In another embodiment, the instructions may be configured to execute the front-end application flow repeatedly based on one or more conditions and may also be configured to execute the one or more business services flows repeatedly based on one or more conditions. The instructions may then be further configured to compile the complete end-to-end flow based, at least in part, on the one or more conditions for the front-end application flow and the one or more conditions for the business services flows.

In yet another embodiment, the instructions may be further configured to store the front-end application flow and a first listing of the one or more business services flows in a first table and store a second listing of the one or more business services flows and a listing of the APIs in a second table. The business services flow included in the first listing may be associated with the front-end application flow, and each of the APIs in the second table may be associated with one of the business services flows in the second listing of one or more business services flows. Moreover, the instructions may be further configured to compile the complete end-to-end flow by, for each of the one or more business services flows in the first table, querying the second table to retrieve each of the APIs associated with the business services flow in the second table corresponding to the business services flow in the first table.

In another embodiment of the invention, a computer program product may be provided that includes a non-transitory computer-readable storage medium including instructions. The instructions may be configured, when executed by the processor, to cause the processor to receive a front-end application flow including at least one call to one or more business services flows, receive one or more business services flows each including one or more calls to APIs, and compile a complete end-to-end flow that includes the front-end application flow and the one or more business services flows. The complete end-to-end flow may be expressed in ordered terms of the one or more business services flows and the one or more calls to the APIs. The instructions may further cause the processor to automatically construct a projected latency for the complete end-to-end flow by totaling response times for each of the one or more calls to the APIs included in the complete end-to-end flow.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Embodiments of the invention provide methods, systems, and computer program products for assessing middleware flow in an EAI system directed towards travel services and managing inventory availability for travel inventory items associated with travel services. Generally, embodiments of the invention may process front-end application flows, business services flows, calls to APIs to generate complete end-to-end flows, and projected latencies for the complete end-to-end flows.

Figure 1:
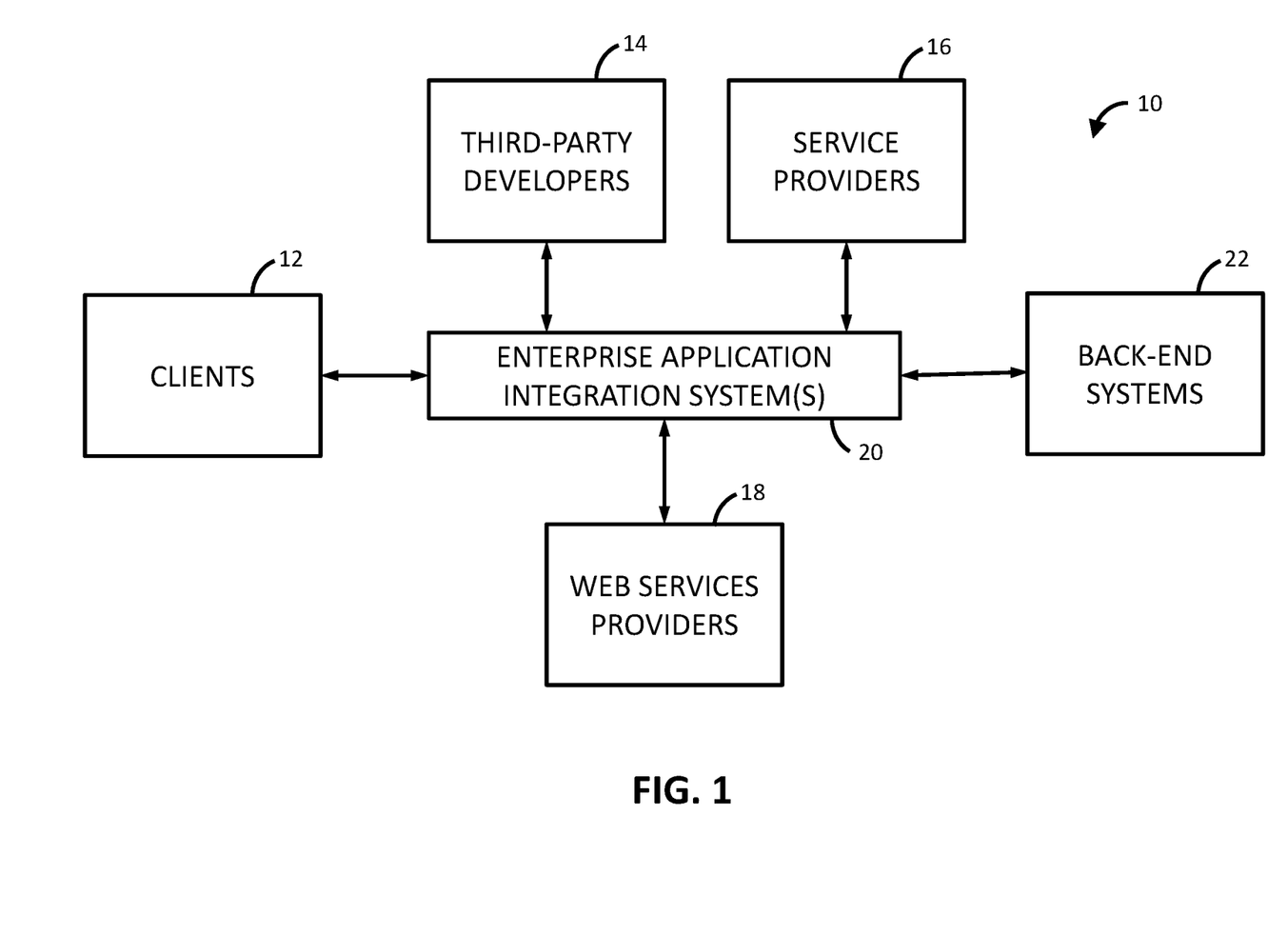
FIG. 1 is a schematic view of an exemplary operating environment that includes a plurality of systems for enhancing EAI.

With reference to FIG. 1 and in accordance with embodiments of the invention, an exemplary development environment 10 may include one or more clients 12, one or more third-party developers 14, one or more service providers 16, one or more web service providers 18, and one or more travel system back-end systems 22. Each of these parties and/or systems may communicate with one or more EAI systems 20. Moreover, each of these parties and/or systems may communicate with one another via one or more private and/or public networks, such as the Internet. One or more of these systems may be logically or physically (e.g., geographically or implemented by separate computer platforms) remote from one another. For example, the client 12, the third-party developer 14, the service provider 16, and the web service provider 18 may be logically or physically remote from the EAI systems 20. One or more of these systems, such as one or more of the EAI systems 20 and/or one or more of the travel system back-end systems 22, may each be implemented by the same one or more computer platforms. For example, two or more EAI systems 20 may share at least one computer platform.

The client 12 may include computer devices or computer systems that enable access to remote systems, such as the EAI system 20, over one or more networks. In one embodiment, a client 12 may be an end user, e.g., a traveler, and may use a device to search and book travel products by accessing the EAI system 20 through a network. Moreover, devices used by the client 12 may include a desktop computer, laptop computer, tablet computer, smart phone, or any other suitable computing device. Alternatively, a client 12 may include a website, server, or program that accesses the EAI system 20, for example, in connection with travel.

Third-party developers 14 may be associated with third-party development systems, and may be entities that are independent of the service providers 16 and web service providers 18. Moreover, a third-party developer 14 may provide front-end applications under the direction of the service providers 16, and the front-end applications may be directly or indirectly interacted with by clients 12.

Service providers 16, e.g., airlines, travel agencies, meta searchers, corporations, airports, hospitality businesses, railway companies, car rental companies and others, may act as service portals and/or content providers, offering a variety of services either using in-house solutions or through partnership with various third-party developers 14. To enable a particular service, service providers 16 may leverage a composite workflow involving the invocation of multiple third party developers 14 to interface with clients 12 and web service providers 18 to interface with back-end systems 22. For example, service providers 16 may utilize web service providers 18 to enable service delivery of travel inventory booking. Service provider offerings, e.g., flight services, are tightly integrated into service provider platforms based on APIs.

Web service providers 18 may enable service providers 16 to utilize back-end systems 22 though "web services", which are self-contained, modular business applications that have open, Internet-oriented, standards-based APIs. An exemplary web service is a software system designed to support interoperable machine-to-machine interaction over a network, having an interface described in a machine-processable format. Other systems may interact with an exemplary web service in a manner prescribed by its description using simple object access protocol (SOAP) messages and conveyed using hypertext transfer protocol (HTTP) with an extensible markup language (XML) serialization in conjunction with other web-related standards. Moreover, facilitation of interactions between service providers 16 and back-end systems 22 may be accomplished by web service providers 18 using XML, SOAP, web service definition language (WSDL), and/or universal description, discovery, and integration (UDDI) open standards over an internet protocol backbone. For example, XML may be used to tag data, SOAP may be used to transfer data, WSDL may be used for describing the services available, and UDDI may be used for listing what services are available.

As an example, the client 12 may be operated by a travel agent company or travel agent system seeking to offer travelers the ability to search and book travel options, including transport by plane, train, and/or bus tickets, as well as hotel reservations, car rental, etc. The service providers 16, e.g., airlines, bus companies, hotel chains, etc., leverage third-party developers 14 and web service providers 18 for travel management, such as the ability to query their offerings and book travel options. Service providers 16 may also include payment providers, such as credit card companies, that also provide services to guarantee payments made by consumers. Via front-end applications developed by third-party developers 14, the traveler submits information to the travel agent service with travel details and the travel agent service subsequently submits the information to the service providers 16. Via business services, the service providers 16 receive the data from the front-end applications, then query the web service provider 18. Via web services, the web service provider 18 can communicate with back-end systems 22 to, for example, determine a list of available flights and/or book a flight or process a check-in.

Figure 2:
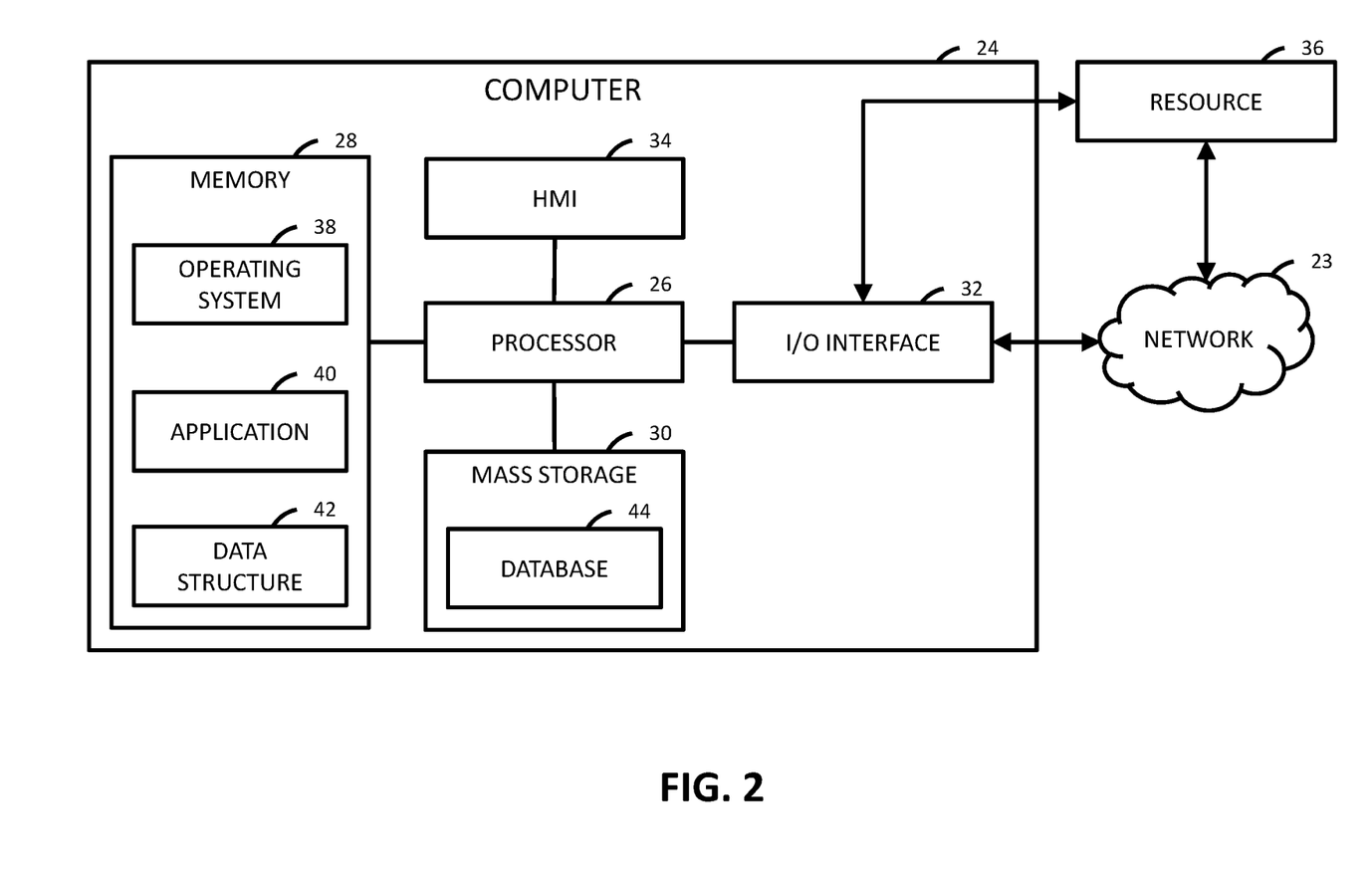
FIG. 2 is a schematic view of an exemplary computer system of FIG. 1.

With reference to FIG. 2, the clients 12, third-party developers 14, service providers 16, web service providers 18, EAI systems 20, and back-end systems 22 may be implemented on one or more computer devices or systems, such as exemplary computer system 24. The computer system 24 may include a processor 26, a memory 28, a mass storage memory device 30, an input/output (I/O) interface 32, and a Human Machine Interface (HMI) 34. The computer system 24 may also be operatively coupled to one or more external resources 36 via the network 23 or I/O interface 32. External resources may include, but are not limited to, servers, databases, mass storage devices, peripheral devices, cloud-based network services, or any other suitable computer resource that may be used by the computer system 24.

The processor 26 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 28. The memory 28 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 30 may include data storage devices such as a hard drive, optical drive, tape drive, non-volatile solid state device, or any other device capable of storing information.

The processor 26 may operate under the control of an operating system 38 that resides in the memory 28. The operating system 38 may manage computer resources so that computer program code embodied as one or more computer software applications, such as an application 40 residing in memory 28, may have instructions executed by the processor 26. In an alternative embodiment, the processor 26 may execute the application 40 directly, in which case the operating system 38 may be omitted. One or more data structures 42 may also reside in memory 28, and may be used by the processor 26, operating system 38, or application 40 to store or manipulate data.

The I/O interface 32 may provide a machine interface that operatively couples the processor 26 to other devices and systems, such as the network 23 or the one or more external resources 36. The application 40 may thereby work cooperatively with the network 23 or the external resources 36 by communicating via the I/O interface 32 to provide the various features, functions, applications, processes, or modules comprising embodiments of the invention. The application 40 may also have program code that is executed by the one or more external resources 36, or otherwise rely on functions or signals provided by other system or network components external to the computer system 24. Indeed, given the nearly endless hardware and software configurations possible, persons having ordinary skill in the art will understand that embodiments of the invention may include applications that are located externally to the computer system 24, distributed among multiple computers or other external resources 36, or provided by computing resources (hardware and software) that are provided as a service over the network 23, such as a cloud computing service.

The HMI 34 may be operatively coupled to the processor 26 of computer system 24 in a known manner to allow a user to interact directly with the computer system 24. The HMI 34 may include video or alphanumeric displays, a touch screen, a speaker, and any other suitable audio and visual indicators capable of providing data to the user. The HMI 34 may also include input devices and controls such as an alphanumeric keyboard, a pointing device, keypads, push-buttons, control knobs, microphones, etc., capable of accepting commands or input from the user and transmitting the entered input to the processor 26.

A database 44 may reside on the mass storage memory device 30, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 26 may be used to access the information or data stored in records of the database 44 in response to a query, where a query may be dynamically determined and executed by the operating system 38, other applications 40, or one or more modules.

Figure 3:
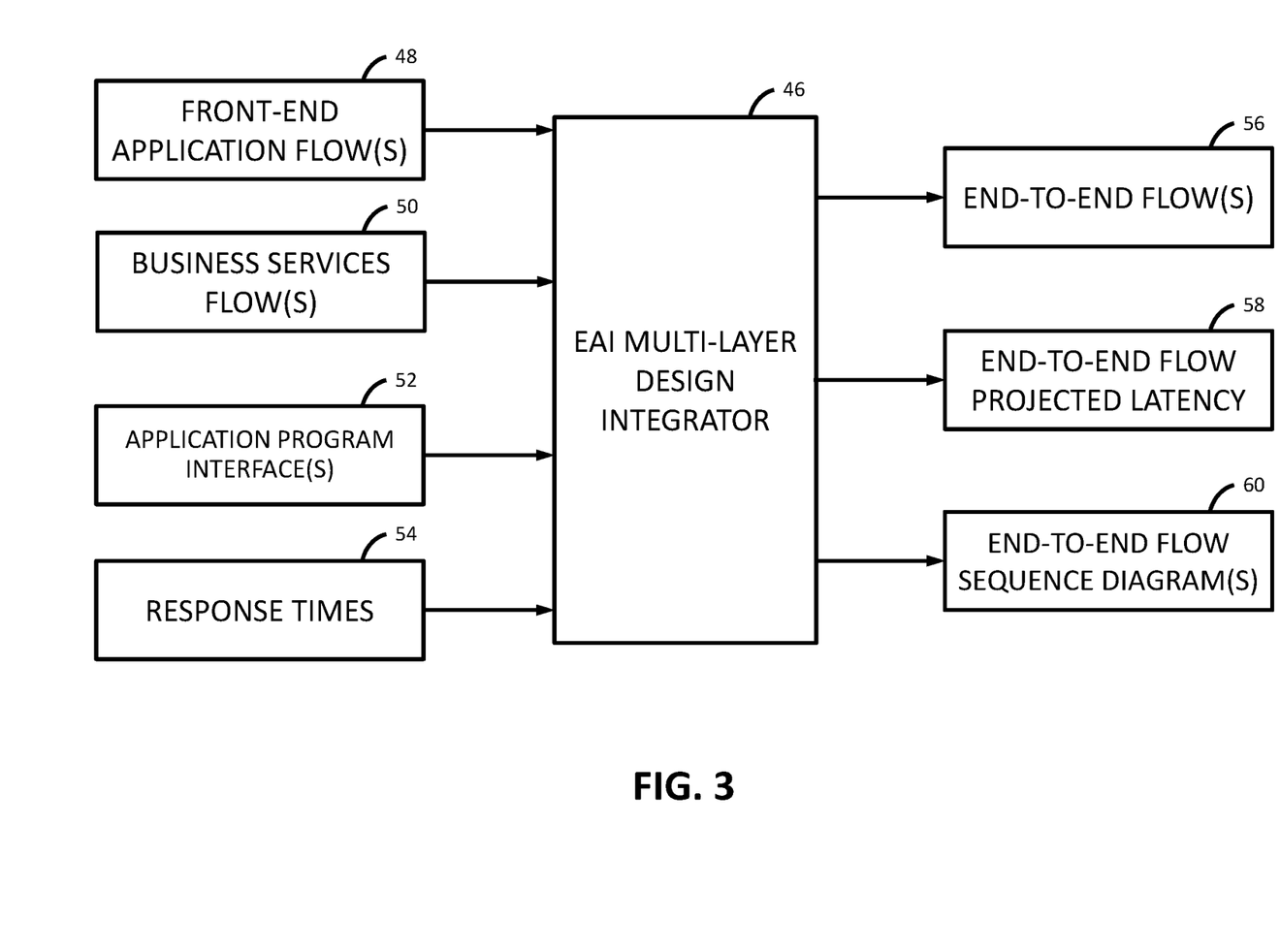
FIG. 3 is a diagram illustrating the inputs and outputs of an EAI multi-layer design integrator that may be used in the development of the integration application system of FIG. 1.

With reference to FIG. 3, an EAI multi-layer design integrator 46 may be used in the development of the EAI system 20 of FIG. 1. As shown, the EAI multi-layer design integrator 46 may receive as inputs one or more front-end application flows 48, one or more business services flows 50, one or more APIs 52, and one or more response times 54. The EAI multi-layer design integrator 46 may compile, construct, and/or generate one or more outputs, including one or more end-to-end flows 56, one or more end-to-end flow projected latencies 58, and one or more end-to-end flow sequence diagrams 60.

The front-end application flows 48 may be developed by third-party developers 14 and may serve as an interface between the client 12 and the service providers 16, forming an application layer or service layer. Moreover, front-end application flows 48 may call business services flows 50, and possibly other front-end application flows 48. The one or more front-end application flows 48 may encompass presentation services such as the display of forms and handling the flow of information to and from a display or interface. The one or more front-end application flows 48 may also include application services, such as implementing user requests and interacting with service providers 16. Furthermore, front-end application flows 48 may be provided by a web browser and may interface with the client 12 by obtaining input and/or presenting output to business services flows 50. For example, front-end application flows 48 may populate a form with data before presenting the form to a user, and to extract data from a form after the user submits it. Moreover, the front-end application flows 48 may provide a user interface, e.g., a graphical user interface (GUI) used by clients 12.

Business services flows 50 are defined by the service providers 16 and may call APIs 52. Moreover, the business services flows 50 may be used to implement business logic and business rules that determine how data can be created, stored, and changed, i.e., prescribe how business objects, such as accounts loans, itineraries, and inventories, interact with one another and enforce the routes and the methods by which business objects are accessed and updated. For example, the front-end application flows 48 of a travel booking website might allow clients 12 to specify travel characteristics (e.g., date, time, and departure/arrival locations), select travel items for booking, specify personal information, supply payment information, etc. The business services flows 50 may specify what happens, for example, during an inventory search process, booking a travel inventory item, and during checkout. The business services flows 50 may also monitor infrastructure to make sure all parts of a site are working properly.

The APIs 52 are defined by web service providers 18 and may be called by the business services flows 50 as an interface to the back-end systems 22. APIs 52 may implement data persistence mechanisms (e.g., database servers, file shares, etc.) and may form a data access layer that encapsulates persistence mechanisms and exposes the data in the back-end systems 22. In other words, the APIs 52 provide a mechanism for service providers 16 to manage, manipulate, or update stored data without exposing or creating dependencies on the data storage mechanisms. Each API 52 may have an associated response time 54, which represents an amount of time that the web service providers 18 take to process a request after receiving one. Response time 54 may be measured by recording the duration of time passed between when the API 52 is called and when the API 52 returns.

As discussed later in further detail, the one or more end-to-end flows 56 specify a flow that starts with a front-end application flow 48, may include one or more business services flows 50 based on calls to one or more business services flows 50 by the front-end application flow 48, and may further include one or more APIs 52 based on calls to one or more APIs 52 by the one or more business services flows 50. Alternatively, an end-to-end flow 56 may include only application flows 48 if the application flows 48 do not call one or more business services flows 50. Similarly, an end-to-end flow 56 may contain only one or more front-end application flows 48 and one or more business services flows 50 if the one or more business services flows 50 do not call one or more APIs 52. As also discussed later in further detail, an end-to-end flow projected latency 58 can be calculated by totaling the response times 54 of the APIs 52 included in the end-to-end flow. The end-to-end flow 56 may also be represented in the form of an end-to-end flow sequence diagram 60 illustrating each step of the end-to-end flow 56.

The middleware flow information associated with each individual middleware business application may include a business services identifier, a module name, a processing order or step, and any corresponding elements, such as conditions or loops. Similarly, front-end application flow information associated with each individual front-end application flow 48 may include a front-end application name and front-end application flow name, as agreed between third-party developers 14 and service providers 16, as well as a processing order or step and any corresponding elements, such as conditions or loops. The EAI multi-layer design integrator 46 may receive response times 54 in any number of forms, including response time statistics based on real production data, test scenarios, or arbitrarily chosen values. By analyzing the input information which may include front-end application flows 48, business services flows 50, APIs 52, and response times 54, as explained in further detail infra, the EAI multi-layer design integrator 46 can then calculate outputs which may include end-to-end flows 56, end-to-end flow projected latencies 58, and end-to-end flow sequence diagrams.

Figure 4:
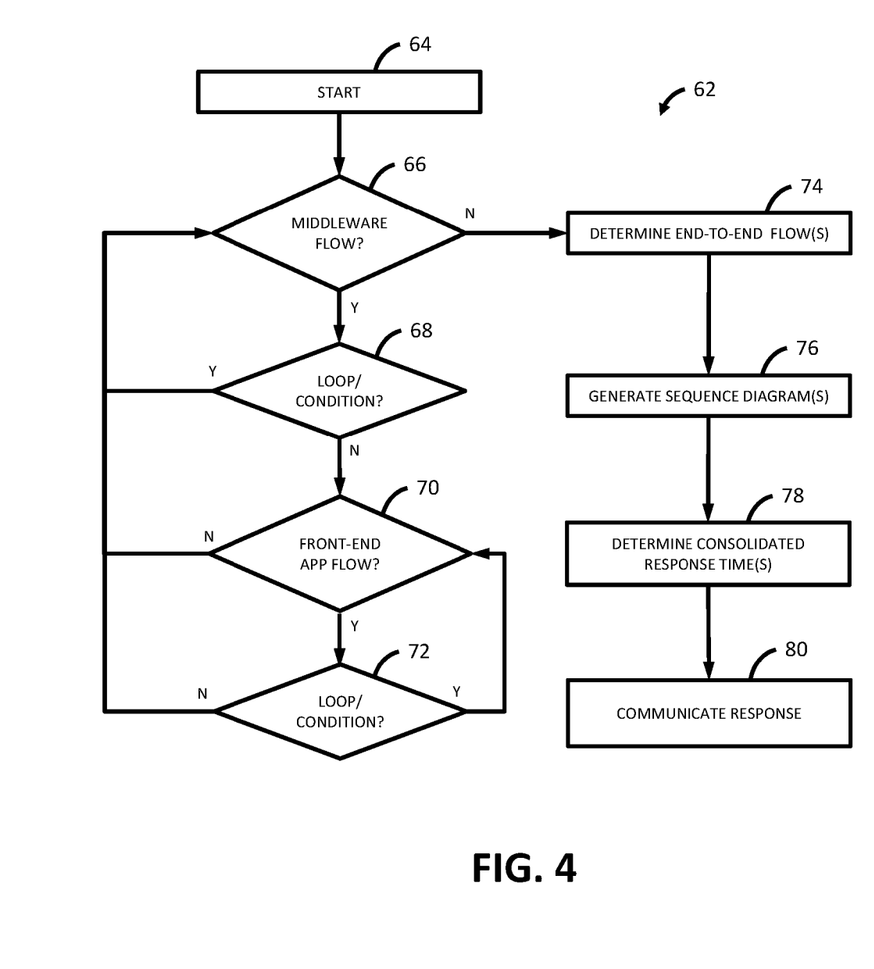
FIG. 4 is a flowchart illustrating a sequence of operations that may be performed by the EAI multi-layer design integrator of FIG. 3 to process an end-to-end diagram flow request.

Turning now to FIG. 4, the EAI multi-layer design integrator 46 may perform a process 62 in accordance with embodiments of the invention to process an end-to-end diagram flow request. In step 64, the EAI multi-layer design integrator 46 may monitor one or more front-end application flows 48, one or more business services flows 50, one or more APIs 52, and/or one or more response times 54 to determine whether to generate one or more end-to-end flows 56, one or more end-to-end flow projected latencies 58, and/or one or more end-to-end flow sequence diagrams. Alternatively, the EAI multi-layer design integrator 46 may be manually run by a user in response to an integration request.

In response to a run command, the EAI multi-layer design integrator 46 may loop through the one or more front-end application flows 48 stored in a first table or database containing a listing of one or more front-end application flows 48 and one or more business services flow 50 calls associated with each front-end application flow 48. It is determined at step 66 if the front-end application flow 48 includes an associated call to a business services flow 50 and, if so, then in optional step 68 it may be further determined if an optional condition under which the business service flow 50 is called has been satisfied and/or if the business service flow 50 has been called a requisite number of times. If it is not determined at step 68 that the optional condition associated with the business service flow 50 has been satisfied and/or that the business service flow 50 has been called the requisite number of times, then steps 66 and 68 may repeat themselves until the optional condition has been satisfied or the business service flow 50 has been called the requisite number of times, at which point the process moves on to step 70.

In step 70, the EAI multi-layer design integrator 46 may loop through a second listing or database of one or more business services flows 50 and one or more call to APIs 52 associated with each business service flow 50. At step 70, the business service flow from the second listing or database of business services flows 50 and APIs 52 matching the business service flow 50 identified in step 66 (from the first listing or database of front-end application calls and business services flows 50) is examined to determine if it includes a call to an API 52. If so, then in optional step 72 it may be further determined if an optional condition under which the API 52 is called has been satisfied and/or if the API 52 has been called a requisite number of times. If it is not determined at step 72 that the optional condition associated with the API 52 has been satisfied and/or that the API 52 has been called the requisite number of times, then steps 70 and 72 may repeat themselves until the optional condition has been satisfied or the API 52 has been called the requisite number of times, at which point the process returns to step 70 to check for the next API 52. Once there are no remaining APIs 52, the process returns to step 66 to check for the next call to a business services flow 50. Once there are no remaining business flows 50, the process moves on to step 74.

In step 74, an end-to-end flow 56 may be determined for each front-end application flow 48 based on steps 66 through 72. As each of steps 66 through 72 is completed, as applicable, the name of the front-end application flows 48, business services flows 50, and APIs 52 are compiled, along with any conditions or loops, in the order in which they are presented in the process. Thus, the complete end-to-end flow 56 comprises a compilation of all of the business services flows 50, APIs 52, and conditions and/or loops associated with calling a given front-end application flow 48.

In step 76, a visual representation of the end-to-end flow 56 may be generated in the form of a sequence diagram 60, where each step of the end-to-end flow 56 is represented visually as a message.

In step 78, a third listing or database containing a listing of APIs 52 and a response time 54 associated with each API 52 may be searched for each API included in the end-to-end flow 56. The response times 54 may be totaled for all of the APIs 52 included in the end-to-end flow 56 to generate an end-to-end flow projected latency 58.

In an alternative embodiment, steps 74 through 78 may be completed throughout steps 66 through 72 of the process through a running compilation of the end-to-end flow 56, sequence diagram 60, and end-to-end flow projected latency 58.

In step 80, the output of the EAI multi-layer design integrator 46 may be provided and a response is communicated. In an embodiment, the end-to-end flow can be communicated in step 80 in a manner compatible with sequence diagram generation tools, such as WebSequenceDiagrams.com.

In repeatedly performing steps 66 through 80 of the process, the relationships between each of the one or more front-end application flows 48, one or more business services flows 50, and/or one or more APIs 52 is defined, allowing an end-to-end flow 56, sequence diagram 60, and end-to-end flow projected latency to be computed for each front-end application flow 48. As the EAI multi-layer design integrator 46 recursively loops through the information associated with each front-end application flow 48 for corresponding business services flow(s) 50 and APIs 52, the process may generate an intermediate result and/or return of information, which may be a consolidation of the business services flow(s) 50 and front-end application flow(s) 48. For example, a particular front-end application flow 48 may have certain associated loops or conditions, as well as ultimately calling a business services flow 50, which may also have its own associated loops or conditions. By reiteratively performing the loops and conditions, first for the front-end application flow 48 and then for the business services flow 50, the combined flow can be generated in such a manner that it is representative of the consolidated flow, including both the front-end application flow conditions and the business services flow conditions.

Figure 5:
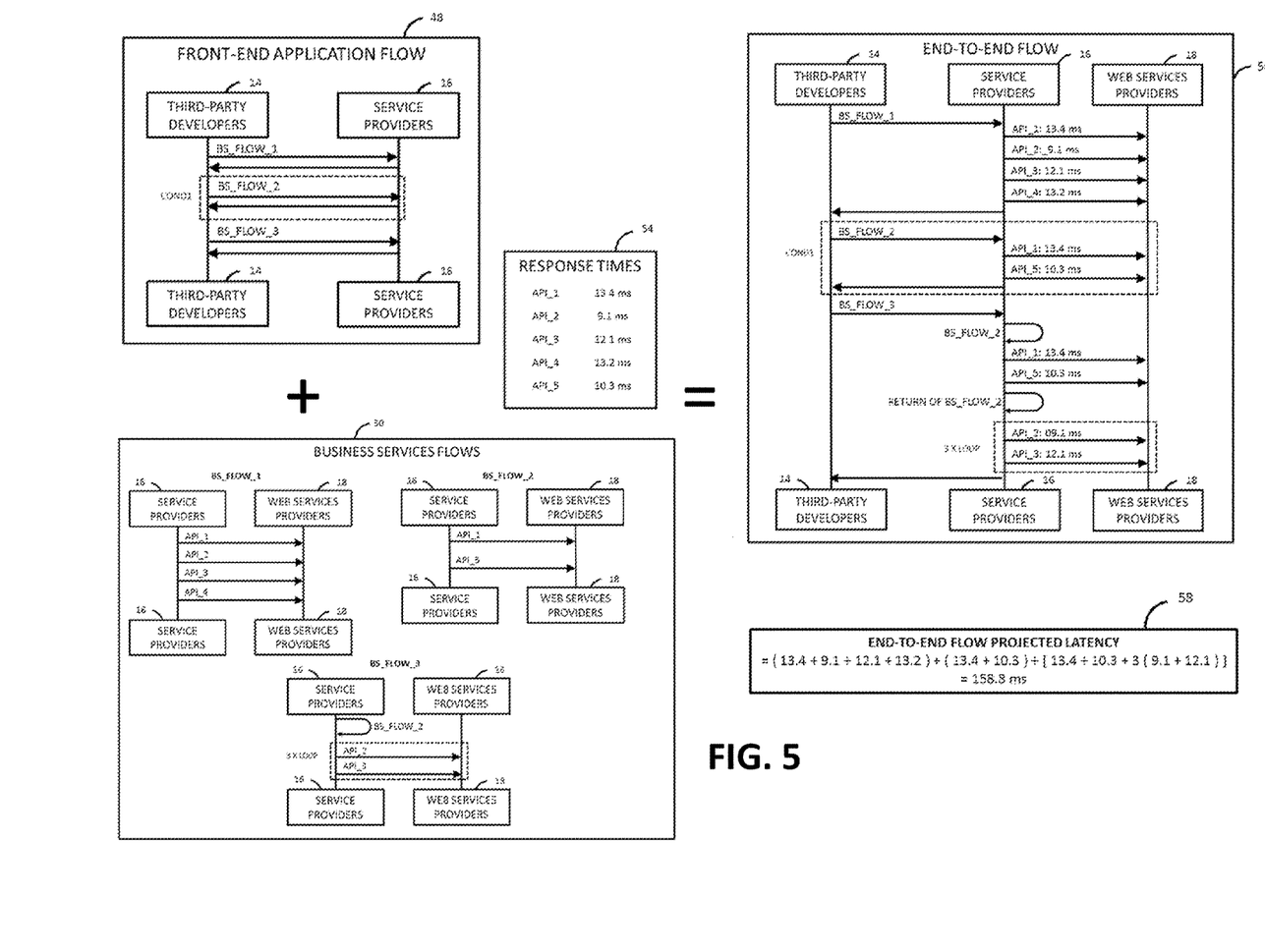
FIG. 5 is an example end-to-end flow diagram that may be output by the EAI multi-layer design integrator of FIG. 3.

FIG. 5 illustrates an example computation by an EAI multi-layer design integrator 46 consistent with an embodiment of the present invention. As shown in FIG. 5, an end-to-end flow 56, represented as an end-to-end flow sequence diagram 60, and an end-to-end flow projected latency 58 are generated from an exemplary front-end application flow 48, exemplary business services flows 50, exemplary APIs 52, and exemplary response times 54. The exemplary front-end application flow 48 includes calls to business services flows 50, which are labeled as 'BS_FLOW_1', 'BS_FLOW_2', and 'BS_FLOW_3'. According to embodiments of the present invention, 'BS_FLOW_2' is shown with an applicable condition associated with execution of the call, labeled 'COND1'. Furthermore, optional conditions may be associated with any of the calls, including calls to front-end application flows 48, business services flows 50, and calls to APIs 52.

The exemplary business services flows 50, include calls to APIs 52, which are labeled 'API_1', 'API_2', 'API_3', 'API_4', and 'API_5'. According to embodiments of the present invention, 'BS_FLOW_3' includes a call to another business flow, specifically 'BS_FLOW_2'. Likewise, the front-end application flow 48 may include calls to other front-end application flows. 'BS_FLOW_3' further includes an optional loop condition associated with the APIs 52 wherein the API calls are looped three times; i.e., calls to the APIs are made three times prior to further processing of the business services flows.

According to embodiments of the present invention, the front-end application flows 48, including calls to business services flows, may be stored in a first table, listing, or database. The business services flows 50, including calls to APIs, may be stored in a second table, listing, or database. As the multi-layer design integrator 46 processes the front-end application flow 48 from the first listing, it may then search the second listing for the business services flow matching the business services flow called by the front-end application flow. Thus the APIs 52 associated with the business services flow 50 may be determined and compiled in the end-to-end flow 56, allowing the front-end application flow 48 to be represented as a complete end-to-end flow 56, including calls to the APIs 52.

A third table, listing, or database of response times 54 may include a listing of APIs 52 and associated response times 54. By compiling the response time 54 associated with each API 52 presented in the end-to-end flow 56, the end-to-end flow projected latency 58 may be calculated. In the example provided in FIG. 5, 'API_1' has a response time of 13.4 ms, 'API_1' has a response time of 13.4 ms, 'API_2' has a response time of 9.1 ms, 'API_3' has a response time of 12.1 ms, 'API_4' has a response time of 13.2 ms, and 'API_5' has a response time of 10.3 ms, As shown, the end-to-end flow projected latency is calculated by totaling each of the APIs 52 appearing in the end-to-end flow 56. As shown, the end-to-end flow projected latency 58 may also reflect time associated with looping or conditions associated with API 52 calls.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of middleware flow assessment prior to completion of an Enterprise Application Integration (EAI) process integrating a front-end application flow with application program interfaces (APIs) and one or more business services flows, the method comprising:
receiving, at a processor, the front-end application flow, wherein the front-end application flow includes at least one call to the one or more business services flows;
receiving, at the processor, the one or more business services flows, wherein each business service flow includes one or more calls to the APIs;

executing, by the processor, the front-end application flow repeatedly based on one or more conditions;
executing, by the processor, the one or more business services flows repeatedly based on one or more conditions;
compiling, by the processor, a complete end-to-end flow that includes the front-end application flow and the one or more business services flows, wherein
the complete end-to-end flow is expressed in ordered terms of the one or more business services flows and the one or more calls to the APIs, and
the complete end-to-end flow is compiled based, at least in part, on the one or more conditions for the front-end application flow and the one or more conditions for the one or more business services flows; and
automatically constructing, by the processor, a projected latency for the complete end-to-end flow by totaling response times for each of the one or more calls to the APIs included in the complete end-to-end flow.

2. The method of claim 1 further comprising:
automatically generating, by the processor, a sequence diagram representing messaging based on the at least one call to the one or more business services flows and the one or more calls to the APIs in the complete end-to-end flow.

3. The method of claim 1 further comprising:
retrieving, by the processor, the response times from a lookup table.

4. The method of claim 1 wherein the response times include latency statistics associated with the APIs.

5. The method of claim 1 wherein the front-end application flow includes one or more step identifiers that define an order of repetition for the front-end application flow, the one or more business services flows include one or more step identifiers that define an order of repetition for the one or more business services flows, and the complete end-to-end flow is compiled based, at least in part, on the one or more step identifiers of the front-end application flow and the one or more step identifiers of the one or more business services flows.

6. The method of claim 1 further comprising:
storing, in a first table, the front-end application flow and a first listing of the one or more business services flows; and
storing, in a second table, a second listing of the one or more business services flows and a listing of the APIs, wherein each business services flow included in the first listing is associated with the front-end application flow, and each of the APIs in the second table is associated with one of the one or more business services flows in the second listing of the one or more business services flows.

7. The method of claim 6 wherein compiling the complete end-to-end flow comprises:
for each of the one or more business services flows in the first table, querying the second table to retrieve each of the APIs associated with the business services flow in the second table corresponding to the business services flow in the first table.

8. A system for middleware flow assessment, the system comprising:
a processor; and
a memory including instructions that, when executed by the processor prior to completion of an Enterprise Application Integration (EAI) process integrating a front-end application flow with application program interfaces (APIs) and one or more business services flows, cause the system to:
receive the front-end application flow, wherein the front-end application flow includes at least one call to the one or more business services flows;
receive the one or more business services flows, wherein each business service flow includes one or more calls to the APIs;
execute the front-end application flow repeatedly based on one or more conditions;
execute the one or more business services flows repeatedly based on one or more conditions;
compile a complete end-to-end flow that includes the front-end application flow and the one or more business services flows, wherein
the complete end-to-end flow is expressed in ordered terms of the one or more business services flows and the one or more calls to the APIs, and
the complete end-to-end flow is compiled based, at least in part, on the one or more conditions for the front-end application flow and the one or more conditions for the one or more business services flows; and
automatically construct a projected latency for the complete end-to-end flow by totaling response times for each of the one or more calls to the APIs included in the complete end-to-end flow.

9. The system of claim 8 wherein the instructions are further configured to cause the system to:
automatically generate a sequence diagram representing messaging based on the at least one call to the one or more business services flows and the one or more calls to the APIs in the complete end-to-end flow.

10. The system of claim 8 wherein the instructions are further configured to cause the system to:
retrieve the response times from a lookup table.

11. The system of claim 8 wherein the response times include latency statistics associated with the APIs.

12. The system of claim 8 wherein the front-end application flow includes one or more step identifiers that define an order of repetition for the front-end application flow, the one or more business services flows include one or more step identifiers that define an order of repetition for the one or more business services flows, and the instructions are further configured to:
cause the system to compile the complete end-to-end flow based, at least in part, on the one or more step identifiers of the front-end application flow and the one or more step identifiers of the one or more business services flows.

13. The system of claim 8 wherein the instructions are further configured to:
store, in a first table, the front-end application flow and a first listing of the one or more business services flows; and
store, in a second table, a second listing of the one or more business services flows and a listing of the APIs,
wherein each business services flow included in the first listing is associated with the front-end application flow, and each of the APIs in the second table is associated with one of the one or more business services flows in the second listing of the one or more business services flows.

14. The system of claim 13 wherein the instructions configured to compile the complete end-to-end flow comprise:

for each of the one or more business services flows in the first table, query the second table to retrieve each of the APIs associated with the business services flow in the second table corresponding to the business services flow in the first table.

15. A computer program product for middleware flow assessment, the computer program product comprising:
a non-transitory computer-readable storage medium; and
instructions stored on the non-transitory computer-readable storage medium that, when executed by a processor prior to completion of an Enterprise Application Integration (EAI) process integrating a front-end application flow with application program interfaces (APIs) and one or more business services flows, causes the processor to:
receive the front-end application flow, wherein the front-end application flow includes at least one call to the one or more business services flows;
receive the one or more business services flows, wherein each business service flow includes one or more calls to the APIs;
execute the front-end application flow repeatedly based on one or more conditions;
execute the one or more business services flows repeatedly based on one or more conditions;
compile a complete end-to-end flow that includes the front-end application flow and the one or more business services flows, wherein
the complete end-to-end flow is expressed in ordered terms of the one or more business services flows and the one or more calls to the APIs, and
the complete end-to-end flow is compiled based, at least in part, on the one or more conditions for the front-end application flow and the one or more conditions for the one ore more business services flows; and
automatically construct a projected latency for the complete end-to-end flow by totaling response times for each of the one or more calls to the APIs included in the complete end-to-end flow.

* * * * *